(12) United States Patent
Buskens et al.

(10) Patent No.: US 6,298,039 B1
(45) Date of Patent: Oct. 2, 2001

(54) HIGH AVAILABILITY DISTRIBUTED CALL PROCESSING METHOD AND APPARATUS

(75) Inventors: Richard Wayne Buskens, Middletown, NJ (US); Thomas F. La Porta, Thornwood, NY (US); Yow-Jian Lin, Edison, NJ (US); Kazutaka Murakami, Freehold, NJ (US); Ramachandran Ramjee, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/017,105

(22) Filed: Jan. 31, 1998

(51) Int. Cl.$^7$ .................................................. H04L 12/50
(52) U.S. Cl. ................................. 370/216; 714/4; 714/16
(58) Field of Search ..................................... 370/216, 242, 370/244, 310, 328, 260; 709/100, 226, 303; 714/1, 2, 5, 4, 15

(56) References Cited

U.S. PATENT DOCUMENTS

| | | | | |
|---|---|---|---|---|
| 4,905,181 | * | 2/1990 | Gregory ................................ | 709/100 |
| 5,105,420 | * | 4/1992 | Ardon et al. .......................... | 370/216 |
| 5,883,939 | * | 3/1999 | Friedman et al. ........................ | 379/9 |
| 6,085,086 | * | 7/2000 | La Porta et al. ...................... | 455/432 |

OTHER PUBLICATIONS

"Structuring Call Control Software Using Distributed Objects"; H. Blair, S. J. Caughey, H. Green and S. K. Shrivastava; International Workshop on Trends in Distributed Computing, Aachen, Germany, 1996; pp. 95–107.
"Distributed Call Processing For Personal Communications Services" T. F. LaPorta, M. Veeraraghavan, P. A. Treventi and R. Ramjee; IEEE Communications Magazine, vol. 33, No. 6, Jun. 1995; pp. 66–75.
"The Role Of New Technologies In Wireless Access Network Evolution"; T. F. LaPorta, A. Sawkar, W. Strom; Proceedings of International Switching Symposium (ISS 1997), IS–03.18, 1997; pp. 533–539.
"Signaling System No. 7: A. Tutorial"; A. R. Modarressi and R. A. Skoog; IEEE Communications Magazine, vol. 28, No. 7, Jul. 1990; pp. 19–35.
"A Survey of Rollback–Recovery Protocols in Message–Passing Systems"; E. N. Elnozahy, D. B. Johnson and Y. M. Wang; Tech. Report CMU–CS–96–181, School of Computer Science, Carnegie Mellon University, Oct. 1996; pp. 1–46.
"Optimistic Recovery in Distributed Systems"; R. E. Strom and S. Yemini; ACM transactions on Computer Systems, vol. 3, No. 3, Aug. 1985; pp. 204–226.
"Why Optimistic Message Logging Has Not Been Used In Telecommunications System"; Y. Huang and Y–M. Wang; Proceedings of the 25th International Symposium on Fault-Tolerant Computing 1995; pp. 459–463.
"Software Fault Tolerance in the Application Layer"; Y. Huang and C. Kintala; Software Fault Tolerance, John Wiley & Sons Ltd.; pp. 231–248.
"Implementation of On–Line Distributed System–Level Diagnosis Theory"; R. P. Bianchini, Jr. and R. W. Buskens; IEEE Transactions On Computers, vol. 41, No. 5, May 1992; pp. 616–626.

* cited by examiner

*Primary Examiner*—Hassan Kizou
*Assistant Examiner*—Inder Mehra
(74) *Attorney, Agent, or Firm*—Jeffery J. Brosemer

(57) ABSTRACT

A method of delivering highly-reliable, fault-tolerant communications services in a telecommunications network of distributed call processing systems. The method advantageously identifies a set of objects within the telecommunications network requiring checkpointing; checkpoints the objects; and subsequently restores the checkpointed objects in the event of a failure. Various aspects of the method are disclosed, including restoration strategies.

9 Claims, 3 Drawing Sheets

FUNCTIONAL OBJECTS FOR DISTRIBUTED CALL PROCESSING

UA obj: USER AGENT OBJECT
CALL obj: CALL OBJECT
CONN obj: CONNECTION OBJECT
CHAN obj: CHANNEL OBJECT

FUNCTIONAL OBJECTS FOR DISTRIBUTED CALL PROCESSING

UA obj: USER AGENT OBJECT
CALL obj: CALL OBJECT
CONN obj: CONNECTION OBJECT
CHAN obj: CHANNEL OBJECT

TYPICAL STATE MACHINE IN CALL PROCESSING SYSTEMS

MSC CALL PROCESSING SOFTWARE STRUCTURE

FAILURE-FREE OVERHEAD: LATENCY VERSUS LOAD WITH AND WITHOUT CHECKPOINTING

HIGH AVAILABILITY DISTRIBUTED CALL PROCESSING METHOD AND APPARATUS

TECHNICAL FIELD

This invention relates generally to the field of telecommunications and in particular to a method for imparting high availability and fault tolerance to distributed call processing systems.

BACKGROUND OF THE INVENTION

The development of telecommunications call processing or switching systems constructed from a distributed set of general purpose computing systems is emerging as an area of particular interest in the art. See, for example, H. Blair, S. J. Caughey, H. Green and S. K. Shrivastava, "Structuring Call Control Software Using Distributed Objects," International Workshop on Trends in Distributed Computing, Aachen, Germany, 1996; T. F. LaPorta, M. Veeraraghavan, P. A. Treventi and R. Ramjee, "Distributed Call Processing for Personal Communication Services," *IEEE Conimunications Magazine*, vol.33, no.6, pp. 66–75, June 1995; and TINA-C, Service Architecture Version 2.0, March 1995.

As noted in a paper published by T. F. LaPorta, A. Sawkar and W. Strom, entitled "The Role of New Technologies in Wireless Access Network Evolution," that appeared in Proceedings of International Switching Symposium (ISS '97), IS-03.18, 1997, systems employing distributed call processing architectures exhibit increased system scalability, performance, and flexibility. Additionally, advances in open distributed processing, such as the Common Object Request Broker Architecture (CORBA), described in "The Common Object Request Broker: Architecture and Specification," by the Object Management Group (OMG) Rev. 2.0, July 1995, facilitate portable and interoperable implementations of distributed software architectures in a heterogeneous computing environment. As is known, systems employing such technologies advantageously leverage a rapidly increasing price/performance ratio of "off-the-shelf" computing components.

The stringent performance and availability requirements of public telecommunications systems pose particular challenges to developing highly available distributed call processing systems which incorporate these off-the-shelf computing components. Specifically, and as noted by A. R. Modarressi, R. A. Skoog, in an article entitled "Signaling System No. 7: A Tutorial", which appeared in *IEEE Communications Magazine*, Vol. 28, No. 7, pp. 19–35, in July 1990, call processing software must process each call request within a few hundred milliseconds, and a switching system may not be out of service for more than a few minutes per year. As such, present day switching systems employ custom-designed fault-tolerant processors and special-purpose operating systems to meet these stringent requirements. In order for next generation switching systems to be built using general purpose computing platforms, software-based fault-tolerant methods and systems are required to achieve the same or similar performance and availability goals.

Two software methods for enhancing the level fault tolerance in a distributed computing environment that have been described in the literature are checkpointing and message logging. See, for example, E. N. Elnozahy, D. B. Johnson and Y. M. Wang, "A Survey of Rollback-Recovery Protocols in Message-Passing Systems," Tech. Report CMU-CS-96- 181, School of Computer Science, Carnegie Mellon University, October 1996, and R. E. Strom and S. Yemini, "Optimistic Recovery in Distributed Systems," *ACM Transactions on Computer Systems*, vol.3, no.3, pp.204–226, August 1985. Briefly stated, checkpointing involves periodically taking a "snapshot" and saving an entire state of a software process while messages sent or received by the software process are logged (message logging) between subsequent checkpoints. Assuming a piecewise deterministic execution model, and as described by Y. Huang and Y. M. Wang, in an article entitled "Why Optimistic Message Logging has not been used in Telecommunications Systems," that appeared in the Proceedings of the 25th International Symposium on Fault-Tolerant Computing, pp. 459–463, 1995, the state of the process can be later reconstructed during a recovery process by replaying logged messages in their original order. As observed by Y. Huang and C. Kintala, in "Software Fault Tolerance in the Application Layer," which appeared In *Software Fault Tolerance* (M. R. Lyu, Ed.), John Wiley & Sons, Chichester, England, pp.231–248, 1995, checkpointing, message logging, and "rollback" recovery techniques can be embedded into the operating system while remaining virtually transparent to application software.

Unfortunately, however, there are numerous disadvantages to these approaches when applied to distributed call processing systems. First, taking a snapshot of the entire process state may create a long period of time during which the process is unable to service requests from its clients, thereby increasing end-to-end call setup latency. Second, a single call request may involve a significant number of message exchanges between functionally distributed servers. Consequently, logging every message becomes too time-consuming to meet stringent call setup latency requirements of only a few hundred milliseconds associated with call processing. Additionally, if checkpoint intervals are made sufficiently long in an attempt to minimize checkpoint overhead, a prohibitively large number of messages my need to be replayed after a failure, thereby making recovery time unacceptably long. Consequently, a continuing need exists in the art for software-based fault-tolerant computing systems suitable for demanding telecommunications applications.

SUMMARY OF THE INVENTION

An advance is made over the prior art in accordance with the principles of the present invention directed to a method of delivering highly-reliable, fault-tolerant communications services in a telecommunications network of distributed call processing systems. The method advantageously identifies a set of objects within the telecommunications network requiring checkpointing; checkpoints the objects; and subsequently restores the checkpointed objects in the event of a failure. Additionally, the method accommodates the selective determination of particular states requiring restoration, and reduces, where desired, duplicate restorations within the system.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description. As can be appreciated by those skilled in the art, a telecommunications network architecture comprises many functional entities (FEs), each of which performs one or more distinct tasks in the network. For example, the Wireless Intelligent Network (WIN) Distributed Functional Plane defines a distributed functional model for wireless intelligent networks. This WIN model includes FEs which provide call control functions, access control functions, service control functions, and location registration functions.

Call processing scenarios refer to various groupings of tasks coordinated through sequences of signaling messages. A distributed call processing system is a mapping of tasks to a collection of co-operating software modules. In general a software module could support tasks of multiple FEs, but only one software module is responsible for all tasks of a single FE.

By way of background, we now define four distributed call processing terms that are based on object-oriented concepts. In particular, we define two object classes, namely, a functional object class and a server class, and two object instances, a functional object and a server instance.

A functional object class corresponds to a FE. It defines u unique call processing functions supported by the class, types of physical and logical resources managed by the class, and any interfaces exported to other functional object classes. A functional object is an instance of a functional object class. Each functional object manages its own assigned resources and associated data corresponding to a single call activity and multiple functional object classes may be needed to service a single call processing request.

Each call processing request results in the creation of one functional object for each of these functional object classes. Collectively, these functional objects created maintain an overall state information related to the request. Accordingly, the functional objects persist until the requested activity (e.g., a call) ends.

A server class corresponds to a software module. It is a unit of computation in a functional object class in a distributed call processing architecture. Server classes support one or more closely related functional object classes. A server instance is an embodiment of a server class, and typically corresponds to a process in a real implementation. A call processing system may have multiple instances of the same server class to allow the system to be scalable in the capacity dimension.

Figure 1:
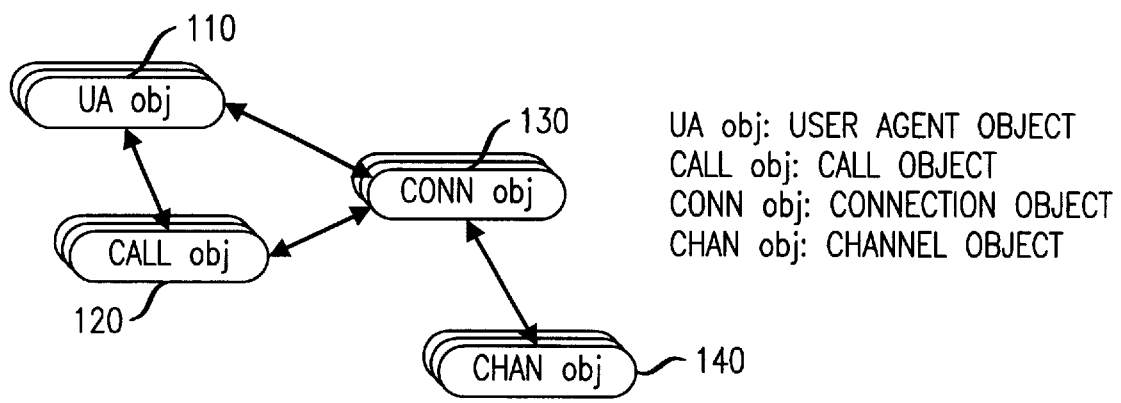
FIG. 1 is a bubble diagram depicting functional objects associated with distributed call processing.

By way of example, and with reference now to FIG. 1, there it shows four classes of functional objects identified in our example Mobile Switching Center (MSC). Specifically, and as shown in the Figure are: User Agent object (UA) 110, Connection object (CONN) 130, Channel object (CHAN) 140, and Call object (CALL) 120.

CONN object 130 performs tasks necessary for establishing a single end-to-end connection and maintains detailed state information about the connection. CHAN object 140, controls resource allocation activities for a specific transport channel resource, such as the channel of a switching device in the MSC.

CALL object 120, records call activities of a specific user, while UA object 110 maintains non-call-related state information about the user (such as a user's service profile). Note that the UA object 110 and CALL object 120 are user-specific, CONN object 130 is unique for each connection, and CHAN object 140 is for a particular resource. As a result, UA 110 and CALL 120 object classes are likely candidates for grouping together within one server class.

Those skilled in the art will appreciate that public telecommunications call processing systems are designed to meet extremely stringent availability requirements due, in large part, to a considerable societal dependence on services provided therefrom. Consequently, only a few minutes of downtime per year are tolerated for these systems. Since it is generally accepted that failures cannot be completely prevented, recovery times from the inevitable failures must be as short as possible to minimize service down time. In addition, the following general requirements must be met by highly available distributed call processing systems:

High performance: Low end-to-end call setup times (less than a few hundred milliseconds).

Active call preservation: Active calls must be preserved across failures. Calls in a transient state, on the other hand, need not be conserved, but may be retried or cleared. Clearing transient calls is a common practice in telecommunications systems.

Resource leak avoidance: Reserved server resources and network channel resources must be released even if a call request is abnormally aborted due to a failure.

Our selective, event-driven checkpointing method, which is the subject of the present invention, checkpoints per functional object instead of per process. As such, we call our novel approach object-level checkpointing. Advantageously, the following general properties of call processing support our approach. Specifically:

Property 1: Functional objects are independent and small in size.

A call activity involves only one functional object per functional object class and there is no mutual dependency among functional objects of the same class. Thus, checkpointing can be scheduled per object without coordinating with other objects in the class. Since call processing systems in public telecommunications networks can handle a large amount of call signaling traffic, a process may contain thousands of functional objects. Each checkpoint thus contains only a tiny fraction of an entire process state.

Unfortunately, even if checkpoints are taken on a per object basis, message logging is generally still required so that the system can recover from lost messages. Nevertheless, call processing systems exhibit another favorable property that allows us to completely eliminate message logging.

Property 2: Call processing systems are surrounded by robust standard signaling interfaces.

A call processing system interacts with external network elements, such as other switching and/or database systems.

Typically, standard signaling protocols are employed at external element interfaces so that different switching systems and devices may inter-work. Signaling protocols used in public telecommunications networks have been designed with high reliability in mind so that lost request or response messages are detected and appropriate recovery actions are invoked. A timeout mechanism is commonly used for this purpose. In particular, upon a timer expiration, a lost request is either retried or aborted, depending on the situation. Consequently, neither message logging nor message replay is necessary for such systems—resulting in lower failure-free overhead and reducing recovery time.

As can be appreciated, an important design consideration for our inventive object-level checkpointing method is to determine when to checkpoint a functional object. A first approach is to checkpoint object whenever its state changes (due to a message receipt). Unfortunately, however, since many message exchanges are involved in a single call setup request, this method significantly deteriorates failure-free performance. Therefore, it is essential to reduce the number of checkpoints produced to minimize run-time overhead. Before describing further our checkpointing method however, it is useful to first review the structure of typical call processing software in an attempt to identify locations within the software at which to perform the checkpointing.

A known characteristic of call processing systems is the asynchronous nature of events. Since multiple parties are involved in a call, two independent, and sometimes conflicting, events may affect a single functional object at the same time. For example, a caller might hang up while connections are being setup for the call. Upon arrival of such an asynchronous event, it may be necessary to abort ongoing procedures for the original request.

Figure 2:
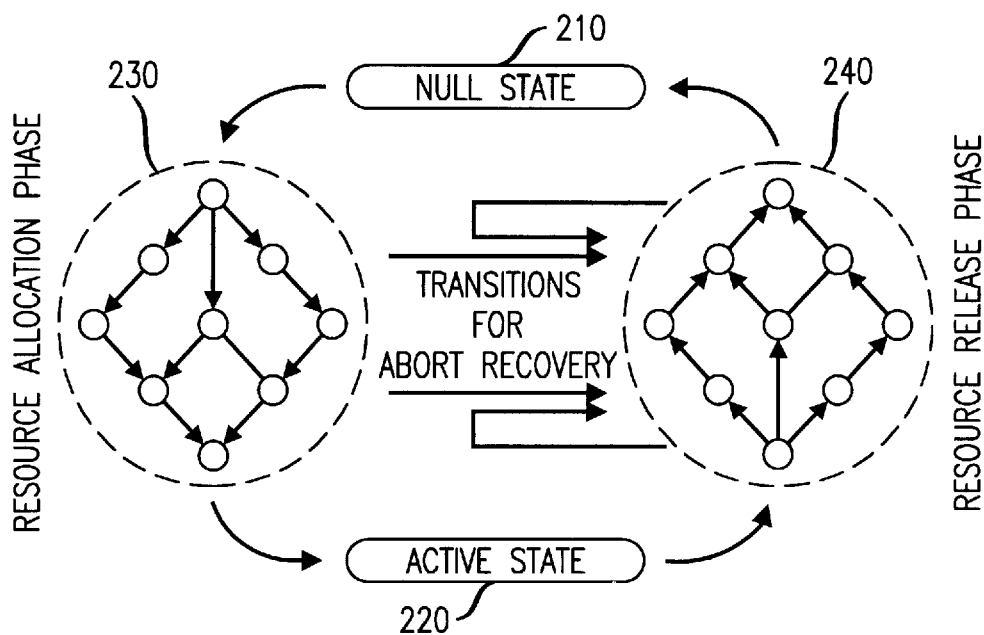
FIG. 2 is a simplified state diagram showing a typical state machine in call processing systems.

To cope with asynchronous event arrivals, a state machine model has been employed for telecommunications systems. FIG. 2 shows a typical state machine for call processing systems. As is shown in this Figure, two stable states, namely a null state 210 and an active state 220, exist along with many other transient states 230, 240 in between. For the CONN object described previously, for example, the active state represents a state where an entire connection is established between end users, while the null state means that there is no connection. The transient states for the CONN object are those states in which a connection is being setup or torn down. Advantageously, the following observation of transient states supports our checkpointing and recovery method.

Property 3: Only a small number of calls are in a transient state.

As should be apparent to those skilled in the art, call establishment and call release procedures take only a few hundred milliseconds. In sharp contrast, average call durations are on the order of many minutes, therefore most call activities are in a stable, active state 220 compared to average call durations which are on the order of minutes.

With these above properties of distributed call processing systems defined, our inventive checkpointing method may be described. Advantageously, our method minimizes the number of checkpoints, while preserving the performance requirements discussed previously. In particular, our method imparts great importance on active call preservation and resource leak avoidance.

Accordingly, our inventive method performs checkpointing when:
1. committing to a stable state, and
2. obtaining new state information required to undo resource allocation or to redo resource clearing.

Advantageously, with our method, all objects in a transient state within a failed server instance are cleared. Since most calls are in a stable state, only a small number of calls are affected by the above checkpointing policies.

Finally, one last property of distributed call processing systems which permits us to further reduce the number of checkpoints is used in our method. Specifically, Property 4: Partial state information is replicated among multiple objects of different functional object classes.

When functional objects are contained within different servers, replicated state information oftentimes exists among the different servers so that a functional object in one server can identify an appropriate functional object in another server. We avoid redundant checkpointing of the same data by designating one of the servers to be responsible for checkpointing any redundant state information shared by the different servers. After a failure, a recovering server that does not checkpoint the redundant state reloads its state information from the server(s) that does checkpoint that state. We descriptively refer to this as state reloading. As should be apparent to those skilled in the art, our inventive method of state reloading reduces the number of checkpoints in the system, leading to lower overall failure-free overhead.

For our purposes, we can identify and distinguish between two types of state reloading, namely, pessimistic state reloading and optimistic state reloading. In pessimistic state reloading, any new call setup requests that arrive at a recovering server before the completion of state reloading are discarded. Conversely, in optimistic state reloading, new call setup requests that arrive at a recovering server are processed before state reloading is completed, based on the assumption that call setup requests do not arrive for users that are already in a call. Thus, optimistic state reloading decreases the time that a recovering server is unavailable to process call requests. In the event that a conflict is found as state is reloaded, the conflicting new call setup request is rejected, and any call setup procedure in progress is aborted.

During recovery from a failure, a recovering server instance must either undo or redo unsuccessful call setup and release attempts, detect state inconsistencies, and resynchronize the states of related objects among distributed servers. Since our selective event-driven checkpointing scheme is performed at the application level, these recovery mechanisms must also be realized at the application level.

Recall from FIG. 2 that there are two main phases in call processing state machines. The first phase is the resource allocation phase and it reserves network resources in stages during the transition from a null state to an active state. The second phase is the resource release phase and it returns the call processing state machine to a null state from an active state by freeing reserved resources. Additional state transitions exist between the transient state in the resource allocation phase and the resource release phase. These transitions usually result from an abort action triggered by an interruptive event like a timeout or hang-up by a caller. Since such events may occur a synchronously with respect to the current state, call processing systems are required to provide abort recovery procedures for each functional object from any state. Importantly, an interruptive event at one server may cause inconsistencies among the states of related functional objects in different servers. Thus, distributed call processing software must provide a global resynchronization procedure to resynchronize the states of the related objects across servers. Abort messages that initiate abort recovery procedures for a functional object may be used for this purpose. Due to the asynchronous arrival of such events, the precise state of an interrupted resource reservation request, for example, is unclear, and it is uncertain if the request is granted or not. Therefore, abort recovery operations must be idempotent. In other words, when they are carried out several times, the same effect is produced as carrying them out only once.

Distributed call processing systems furnish idempotent operations, abort recovery procedures, and global resynchronization procedures. Given this characteristic, only minimal effort is required to support recovery from failures. Specifically, to avoid resource leaks, a recovering server instance must initiate abort recovery procedures for the functional objects it maintains that are in transient states, invoking system-wide resynchronization procedures as necessary. The idempotent resource release operations permit fewer checkpoints to be taken during call setup and call release, with no adverse effects of unnecessarily reissuing release requests during recovery.

To further shorten recovery time after a failure, a paired, primary-backup approach may be used for each server instance. In particular, the primary and its backup run on different hosts in order to survive a single processor failure. The primary server instance processes all incoming requests and checkpoints its state information to its backup, as necessary. Since a backup server is already executing when a primary failure occurs, server unavailability is reduced due to shorter failover times.

Exemplary System: Mobile Switching Center

We now present our inventive method and principles described previously, to a call processing system for wireless networks, commonly called a Mobile Switching Center (MSC). Those skilled in the art will recognize that an MSC is a local switching facility in a wireless network. Each MSC controls mobile traffic in a service area that is further divided into multiple geographical regions called cells. A Base Station (BS) within each cell manages radio resources between the BS and all Mobile Stations (MS) roaming within the cell.

All base stations within the service area of an MSC are connected via known, wire-line connections to the MSC, which in turn is interconnected to other MSCs and further to the Public Switched Telephone Network (PSTN). A Home Location Register (HLR) is connected to the PSTN and keeps a global database identifying which MSC is responsible for setting up calls to a particular MS. The process by which a MS is located within an MSC's service area during call setup is generally known as paging.

An MSC performs at least two important functions, namely, call processing and mobility management. Call processing includes setting up and tearing down a connection between calling and called parties as well as paging mobile stations (MSS). Mobility management includes power-up and power-down registration of MSs, resulting in updates to the MS's location information in the corresponding HLR.

Figure 3:
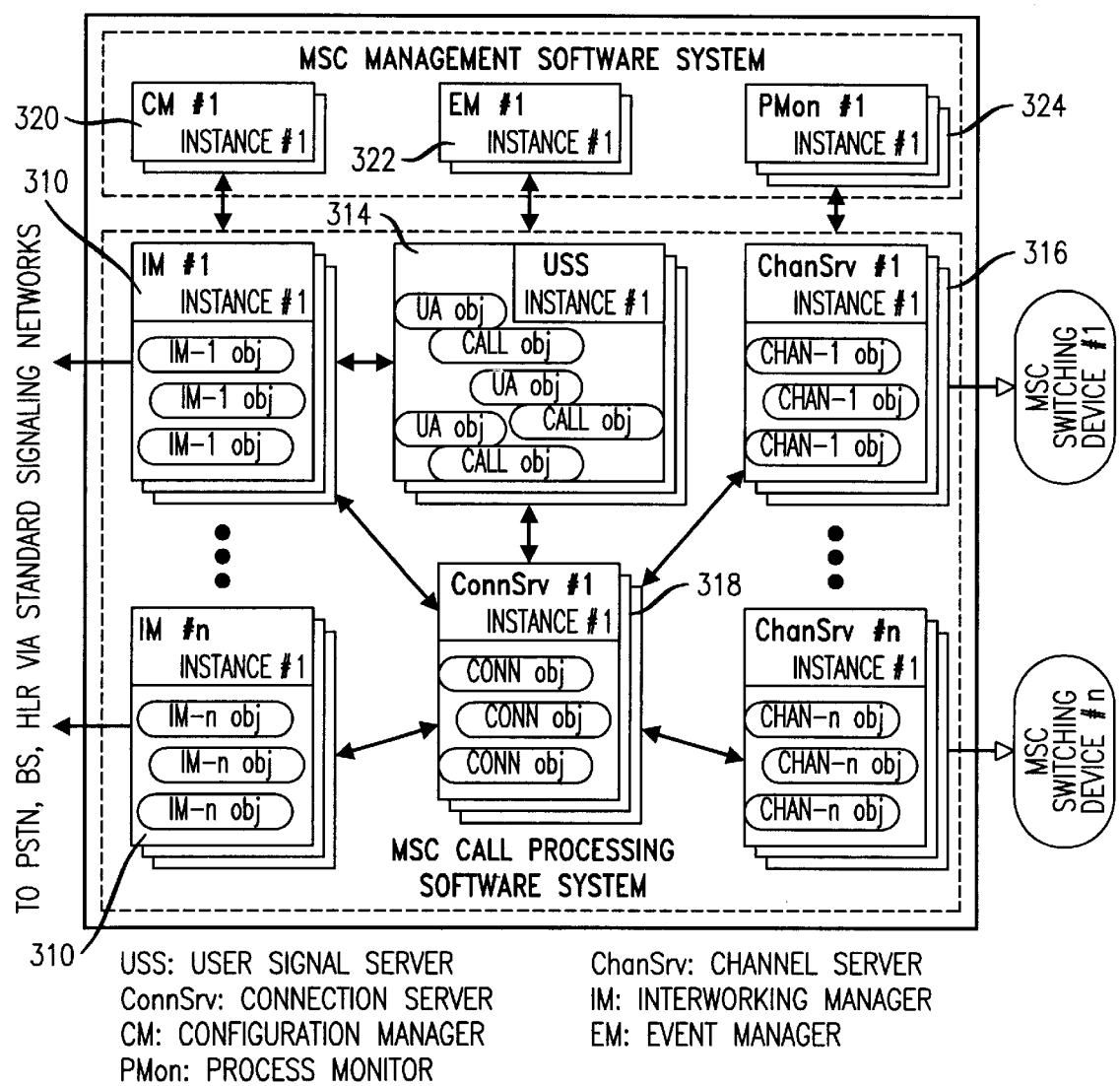
FIG. 3 is a block diagram of call processing software for a mobile switching center according to the teachings of the present invention.

With reference now to FIG. 3, there is shown an MSC 300 illustrating the inventive principles of present invention. As shown in this Figure, there are four types of call processing server classes: interworking managers (IMs) 310, 312, user signaling servers (USSs) 314, channel servers (ChanSrvs) 316, and connection servers (ConnSrvs) 318. The figure also depicts three types of management servers, namely, configuration managers (CMs) 320, event managers (EMs) 322, and process monitors (PMons) 324. Those skilled in the art will quickly recognize, and, as depicted in this Figure, multiple instances of each server may exist in a system.

Interworking managers (IMs) 310, 312 act as protocol gateways to internal MSC servers, isolating them from external signaling protocols and thereby allowing the MSC to evolve independently of these protocols. Accordingly, an IM may terminate one or more signaling protocols and multiple types of IMs may exist within a single MSC. Functional objects within an IM record mapping information between identifiers, such as call id, used both internal and external to the MSC to correlate call processing activities.

User signaling server (USS) 314 maintains information about the registration status of mobile stations currently roaming within the service area of the MSC in UA objects. A USS also houses CALL objects, each recording call activities involving a particular mobile station.

Channel servers (ChanSrvs) 316, 326 maintain CHAN objects to manage resources of switching devices allocated during call setup and deallocated during call release. Examples of resources managed include a switching fabric used to setup physical connection segments and voice encoders/decoders that take packet data from a wireless link (air interface) and convert it to constant bit rate audio.

A connection server (ConnSrv) 318 coordinates the allocation of channel resources to setup a connection to the BS of the cell in which the MS is currently roaming. The ConnSrv 318 instructs appropriate ChanSrvs 316, 326 to reserve needed channel resources within the MSC and sends messages to external components via IMs 310, 312 to reserve channel resources external to the MSC. Each ConnSrv maintains detailed state information about a single connection for a mobile station in a CONN object.

A Process Monitor (PMon) 324 detects failures of both server instances and processors. An Event Manager (EM) 322 collects failure reports from PMons, performs fault isolation, and informs a Configuration Manager (CM) 320 of actual failures. The CM 320 then coordinates appropriate system-wide recovery actions, including necessary reconfiguration activities. The CM 320 also performs overall system initialization.

The various call processing servers described above use different strategies for checkpointing and state reloading. ConnSrvs 318 perform selective event-driven checkpointing of CONN objects using the checkpoint method described previously. Since all ConnSrv state is contained within CONN objects, state reloading is not needed. USSs 314 perform selective event-driven checkpointing of UA objects and optimistic state reloading for CALL objects. CALL objects can be derived from corresponding UA and CONN objects. Pessimistic state reloading is used for CHAN objects to ensure that channel resources allocated before a ChanSrv failure are not mistakenly reallocated during recovery. CHAN objects can be recreated from information in CONN objects. Advantageously, the IMs 310 used in our method are stateless and therefore require no checkpointing or state reloading.

Process crashes, hangs and processor failures are but three causes of process failures. The former can be readily detected by a PMon as an underlying connection break (e.g. TCP/IP connection) with the failed process, typically within a hundred milliseconds. Detecting process hangs is achieved by PMons periodically exchanging "keep alive" messages with each process. An unsuccessful "keep alive" message exchange indicates a potential failure of the process. We descriptively refer to these types of periodic message exchange interval as the heartbeat interval. Those skilled in the art will understand that the heartbeat interval determines failure detection time.

According to our inventive method, we assume that PMons are very reliable and therefore are immune from failure unless an underlying processor fails. Consequently, processor failure detection simply involves the detection of PMon failures. To effect this, PMons are deployed on all host machines and monitor each other using a (dynamic) testing assignment.

Once a failure is detected, recovery actions are initiated. The following list enumerates the recovery steps that occur following the hang of a primary server instance (process) that uses pessimistic state reloading:

1. The PMon reports the unsuccessful "keep alive" message exchange to EM;
2. EM performs fault isolation to identify the server instance that has failed;
3. This failure is reported to the CM, which coordinates all remaining recovery actions;
4. Signaling are connections are established between the failed server instance's backup and all server instances originally communicating with the failed server instance;
5. State reloading procedures are initiated in the backup server instance, if necessary;
6. Once state reloading is complete, the backup server instance becomes a primary server instance. This new primary commences state resynchronization procedures and starts accepting new incoming call processing messages. Call processing messages that arrive before this step are discarded;
7. After the new primary becomes available, a new backup server instance is instantiated;
8. The new primary checkpoints its entire state to the new backup. This procedure is referred to as checkpoint dumping.

For recovery after backup server instance failures, steps 1–3, 7 and 8 are executed. Recovery actions initiated by the failure of a primary server instance that uses optimistic state reloading take the same steps as above, except that the backup server instance becomes a primary after step 4 and incoming calls that arrive during state reloading are processed instead of discarded.

Our inventive MSC architecture and underlying methods have been evaluated with a number of commercially available, UNIX workstations interconnected via a local area network. For our purposes of evaluation, each MSC call processing server is implemented as a UNIX process. Interprocess communication between MSC servers is effected through Orbix, a well-known CORBA based middleware platform. Server instances are implemented as CORBA objects, while functional objects are implemented as C++ objects. The MSC implementation includes three classes of IMs to support well-known, standard telecommunications signaling interfaces, namely: an IS-634A interface over TCP/IP for call/connection control signaling with base stations; an IS-41 interface over SS7 for mobility management signaling with an HLR; and an ISDN User Part (ISUP) interface over SS7 for call/connection control signaling with PSTN switching nodes. A single class of channel servers in this implementation executes on an embedded system that provides frame selection and vocoding capabilities.

In our exemplary implementation, a mobile station registration scenario involves four CORBA message exchanges within MSC servers and a single checkpoint when the registration state (powered up or powered down) changes. Processing a call setup request originated from a mobile station, i.e. a call origination scenario, involves nine CORBA message exchanges and three checkpoints, while a call setup request coming from PSTN, i.e. a call termination scenario, requires seventeen CORBA message exchanges and two checkpoints. A call release request involves nine CORBA message exchanges and two checkpoints. Notice that our proposed scheme requires only 25% of all state transitions due to message arrivals to be checkpointed, considerably reducing failure-free overhead compared to traditional approaches.

The MSC hardware platform used for our exemplary implementation consists of two SUN Ultra 2 workstations, each housing a single 200 Mz UltraSPARC-I processor, interconnected via a 10 Mbps Ethernet. The MSC software configuration consists of two instances each of the USSs and ConnSrvs, one PMon instance per workstation, and one instance each of the other MSC call processing and management servers. We distribute all server instances, including backups for each primary call processing server instance, across the two workstations. Two simulators are employed to generate user registration and call processing traffic, one to simulate a BS and the other to simulate the HLR and PSTN switching nodes.

The simulators execute on separate UltraSparc workstations and exchange call processing messages with the MSC via TCP/IP connections to the IMs. In our experiments, a Poisson distribution models registration and call request arrival rates. An exponential distribution models call holding time.

To evaluate the failure-free checkpointing overhead of the MSC, we measured call setup latencies of our experimental configuration both with and without checkpointing to backup servers. For our purposes, we assume 40,000 registered mobile stations and a 90-second average call holding time. Performance with several call arrival rates are examined, while the ratio of originating/terminating calls is kept fixed at a ratio of approximately two-to-one. Power-up registration for all mobile stations is performed in advance of the performance evaluation, although registration traffic for handoffs does take place during the measurement period. This handoff registration traffic does not incur any checkpointing at the USSs. In the experiments, call setup latency is measured at the two simulators since this reflects the delay incurred within the MSC as perceived by end users.

Figure 4:
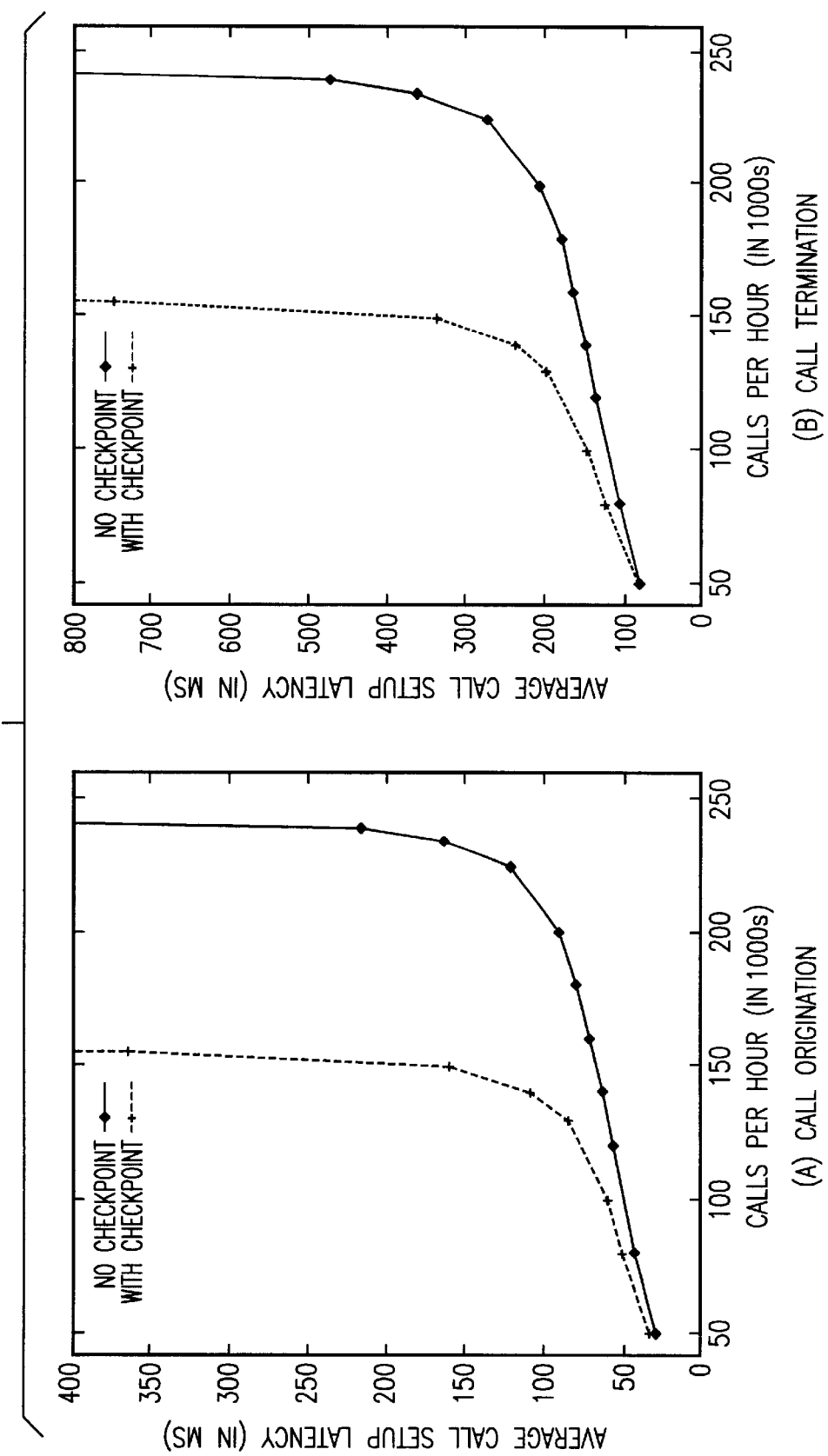
FIG. 4(a) shows in graphical form the average call setup latency (ms) vs. calls/hour (1000s) at call origination for the mobile switching center of FIG. 3 constructed according to the teachings of the present invention.
FIG. 4(b) shows in graphical form the average call setup latency (ms) vs. calls/hour (1000s) at call termination for mobile switching center of FIG. 3 constructed according to the teachings of the present invention.

With reference now to FIG. 4, there is shown the average call setup latency versus call throughput. Results are shown for both call origination and call termination, since call setup procedures are slightly different for the two cases (call termination involves paging to locate the mobile station). The latency curves have knees when the latency goes beyond 75 milliseconds for call origination and beyond 180 milliseconds for call termination. At the knee, the call throughput is 120K calls/hour with fault-tolerance support (180K calls/hour if checkpointing is not performed). This represents the maximum call throughput for the given system configuration; beyond this call throughput, the MSC becomes overloaded. Note that checkpointing to backup processes reduces call throughput by 33%.

Table 1 summarizes the mean recovery time at 120K calls/hour for crash failures of the primary server instances of the various MSC servers. For illustration purposes, recovery times for primary USS failures are presented both for pessimistic and optimistic state reloading. Forty samples are collected for each case. Timestamps were taken by the CM at four different events during recovery, relative to the time when the failure is first reported to the CM. These events are described as follows.

TABLE 1

| | Primary USS Failure | | | | |
|---|---|---|---|---|---|
| Failure Event | Pessimistic State Reloading | Optimistic State Reloading | Primary ConnSrv Failure | Primary IM Failure | Primary ChanSrv Failure |
| ReconnectDoneTime | 0.29 | .027 | .016 | 0.15 | 0.20 |
| ReloadDoneTime | 1.73 | 2.13 | 0.20 | 0.18 | 2.53 |
| DumpCheckpointTime | 5.10 | 5.95 | 4.09 | — | — |
| DumpDoneTime | 16.33 | 16.48 | 5.15 | — | — |

ReconnectDoneTime identifies the time when all lost signaling connections between a failed primary and other server instances are re-established with a backup. For ConnSrvs and USSs operating with optimistic state reloading, the backup server instance is activated (becomes the new primary) at this point, and new call requests can be accepted.

ReloadDoneTime identifies when state reloading is complete. For USSs that use pessimistic state reloading, new call processing messages can be accepted after this point. For ConnSrv failures, the time between ReconnectDoneTime and ReloadDoneTime is used to initiate resynchronization procedures for transient objects in the failed server. Due to the small number of transient calls in the system, this time difference is small. For USS failures, the difference between ReconnectDoneTime and ReloadDoneTime is greater for optimistic state reloading than for pessimistic state reloading since, for optimistic state reloading, new call requests are accepted and processed during state reloading of CALL objects from the ConnSrvs. Our experimentation shows that optimistic state reloading results in a 75% reduction of lost calls over the pessimistic state reloading approach.

Approximately 3.5 seconds elapse between ReloadDoneTime and DumpCheckpointTime for the CM to create a new backup process. DumpCheckpointTime identifies the time at which the primary performs checkpoint dumping to store a copy of its state information at the new backup, and DumpDoneTime indicates when this procedure has completed. At a load of 120K calls/hour using a 90-second call holding time, each USS houses approximately 20,000 UA objects which must be downloaded during this time (corresponding to 2MB of data), while a ConnSrv contains only 1,500 CONN objects. This explains why roughly ten seconds are needed to checkpoint complete USS state information, compared to just over one second for ConnSrv failures. After DumpDoneTime, i.e. 5 to 17 seconds after the failure is reported to CM, the system is ready for the next failure of this specific server instance.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The claimed invention is:

1. A method of delivering high-reliability, fault-tolerant communications services within a telecommunications network comprising the steps of
   identifying a set of objects within the telecommunications network requiring checkpointing wherein said set of objects are identified by
      first, determining a set of global objects within the telecommunications network requiring checkpointing;
      second, identifying duplicate objects within the global object set;
      third, determining, which ones of said duplicate objects require checkpointing; and
      fourth, eliminating, from the global object set, duplicate objects which do not require checkpointing;
   checkpointing the objects upon the occurrence of a particular event; and
   restoring the checkpointed objects upon the occurrence of a predetermined event.

2. The method according to claim 1 further comprising the step of:
   determining one or more states of the telecommunications network requiring restoration.

3. The method according to claim 2 wherein said checkpointing step is performed when committing to a stable state.

4. The method according to claim 2 wherein said checkpointing step is performed when new state information is obtained that is required to undo a resource allocation.

5. The method according to claim 2 wherein said checkpointing, step is performed when new state information is obtained that is required to redo a resource clearing.

6. The method according to claim 3 wherein said stable state is an active call in the telecommunications network.

7. The method according to claim 4 wherein said resource allocation is characterized by reserving a set of network resources during a transition from a null state to an active state.

8. The method according to claim 5 wherein said resource clearing is characterized by returning a call processing state machine to a null state from an active state.

9. The method according to claim 1 wherein said restoring step comprises the steps of:
   detecting state inconsistencies; and
   resynchronizing the states of related objects among distributed servers.

* * * * *